United States Patent

Lee et al.

(10) Patent No.: US 10,026,181 B2
(45) Date of Patent: Jul. 17, 2018

(54) METHOD AND APPARATUS FOR DETECTING OBJECT

(71) Applicant: Samsung Electronics Co., Ltd., Suwon-si, Gyeonggi-do (KR)

(72) Inventors: Changkyo Lee, Seoul (KR); Jaejoon Han, Seoul (KR); Wonjun Hwang, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 52 days.

(21) Appl. No.: 15/237,082

(22) Filed: Aug. 15, 2016

(65) Prior Publication Data

US 2017/0154428 A1    Jun. 1, 2017

(30) Foreign Application Priority Data

Nov. 30, 2015  (KR) .................. 10-2015-0168796

(51) Int. Cl.
  *G06T 7/70*   (2017.01)
  *G06T 7/00*   (2017.01)
  *G06K 9/20*   (2006.01)

(52) U.S. Cl.
  CPC .......... *G06T 7/0044* (2013.01); *G06K 9/2054* (2013.01); *G06T 2207/30201* (2013.01); *G06T 2207/30232* (2013.01)

(58) Field of Classification Search
  CPC .......... G06K 9/00261; G06K 9/00597; G06K 9/0061; G06T 7/70; G06T 7/74; G06T 7/97; G06T 2207/20016; G06T 2207/30201

See application file for complete search history.

(56) References Cited

U.S. PATENT DOCUMENTS

| | | | | |
|---|---|---|---|---|
| 5,742,710 | A * | 4/1998 | Hsu et al. | 382/236 |
| 5,987,154 | A | 11/1999 | Gibbon et al. | 382/115 |
| 6,590,999 | B1 | 7/2003 | Comaniciu et al. | 382/103 |
| 6,639,998 | B1 | 10/2003 | Lee et al. | 382/103 |
| 2010/0061636 | A1 | 3/2010 | Fukushima et al. | 382/190 |
| 2013/0022243 | A1* | 1/2013 | Xu et al. | 382/103 |
| 2015/0269449 | A1* | 9/2015 | Kosaki | G06K 9/00805 382/103 |
| 2016/0063727 | A1* | 3/2016 | Gao et al. | G06T 7/20 382/103 |

FOREIGN PATENT DOCUMENTS

| | | |
|---|---|---|
| JP | 2008107925 A | 5/2008 |
| JP | 2009100256 A | 5/2009 |
| JP | 2012226608 A | 11/2012 |
| KR | 100322911 B1 | 2/2002 |
| KR | 100438303 B1 | 7/2004 |
| KR | 20080072826 A | 8/2008 |
| KR | 20130006752 A | 1/2013 |
| KR | 101292980 B1 | 8/2013 |

* cited by examiner

*Primary Examiner* — Andrew W Johns
(74) *Attorney, Agent, or Firm* — Harness, Dickey & Pierce, P.L.C.

(57) ABSTRACT

An object detection method and apparatus are provided. The object detection method may include adaptively generating a pyramid image corresponding to a current frame based on information associated with a target object detected from a previous frame.

17 Claims, 9 Drawing Sheets

METHOD AND APPARATUS FOR DETECTING OBJECT

CROSS-REFERENCE TO RELATED APPLICATION

This application claims under 35 U.S.C. § 119 to Korean Patent Application No. 10-2015-0168796, filed on Nov. 30, 2015, in the Korean Intellectual Property Office, the entire contents of which are incorporated herein by reference in its entirety.

BACKGROUND

1. Field

At least one example embodiment relates to a method and/or an apparatus for detecting an object.

2. Description of the Related Art

An object detection technology is used to detect a predetermined and/or selected target from a given image. Using the object detection technology, the predetermined and/or selected target may be detected from an image acquired by a security camera, for example, a closed circuit television (CCTV), or an image acquired by an electronic device, for example, a mobile terminal, a television (TV) or a camera.

A performance of object detection may be determined based on accuracy and a speed.

SUMMARY

At least some example embodiments relate to an object detection method.

In at least some example embodiments, the object detection method may include adaptively generating a pyramid image corresponding to a current frame based on information associated with a target object detected in a previous frame, and scanning for the target object from the pyramid image corresponding to the current frame.

The information associated with the target object may include at least one of (i) a pyramid identification (ID) of a selected sub-image including the target object, the selected sub-image being one of a plurality of sub-images included in a pyramid image corresponding to the previous frame, (ii) a location of the target object in the selected sub-image, and (iii) a size of the target object in the selected sub-image.

The target object may include at least one of a face, an eye and an iris of a user.

The adaptively generating of the pyramid image corresponding to the current frame may include generating a pyramid image of a first range corresponding to the current frame to have first range of the plurality of sub-images based on the pyramid ID.

The object detection method may further include adaptively setting a scan area of the target object based on the information associated with the target object.

The detecting of the target object from the pyramid image may include scanning a plurality of sub-images included in the pyramid image corresponding to the current frame based on the scan area and detecting the target object.

The object detection method may further include extracting the information associated with the target object from a pyramid image of a full range corresponding to the previous frame.

The adaptively generating of the pyramid image corresponding to the current frame may further include adaptively determining a number of sub-images in the pyramid image corresponding to the current frame based on the information associated with the target object.

At least other example embodiments relate to an object detection method.

In at least some example embodiments, the object detection method may include generating a pyramid image corresponding to a current frame, and adaptively setting a scan area to detect a target object from the pyramid image based on information associated with the target object detected in a previous frame.

The information associated with the target object may include at least one of (i) a location of the target object in the previous frame, (ii) a size of the target object in the previous frame, and (iii) a size of a selected sub-image including the target object, the selected sub-image being one of a plurality of sub-images included in a pyramid image corresponding to the previous frame.

The adaptively setting of the scan area may include setting sets the scan area to include a location at which the target object is in the previous frame.

At least other example embodiments relate to an object detection apparatus.

In at least some example embodiments, the object detection apparatus may include at least one processor configured to execute computer readable instructions to, adaptively generate a pyramid image corresponding to a current frame based on information associated with a target object in a previous frame, and detect the target object from the pyramid image corresponding to the current frame.

The object detection apparatus may further include a scan area setter configured to adaptively set a scan area to detect the target object from the pyramid image corresponding to the current frame based on the information associated with the target object.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
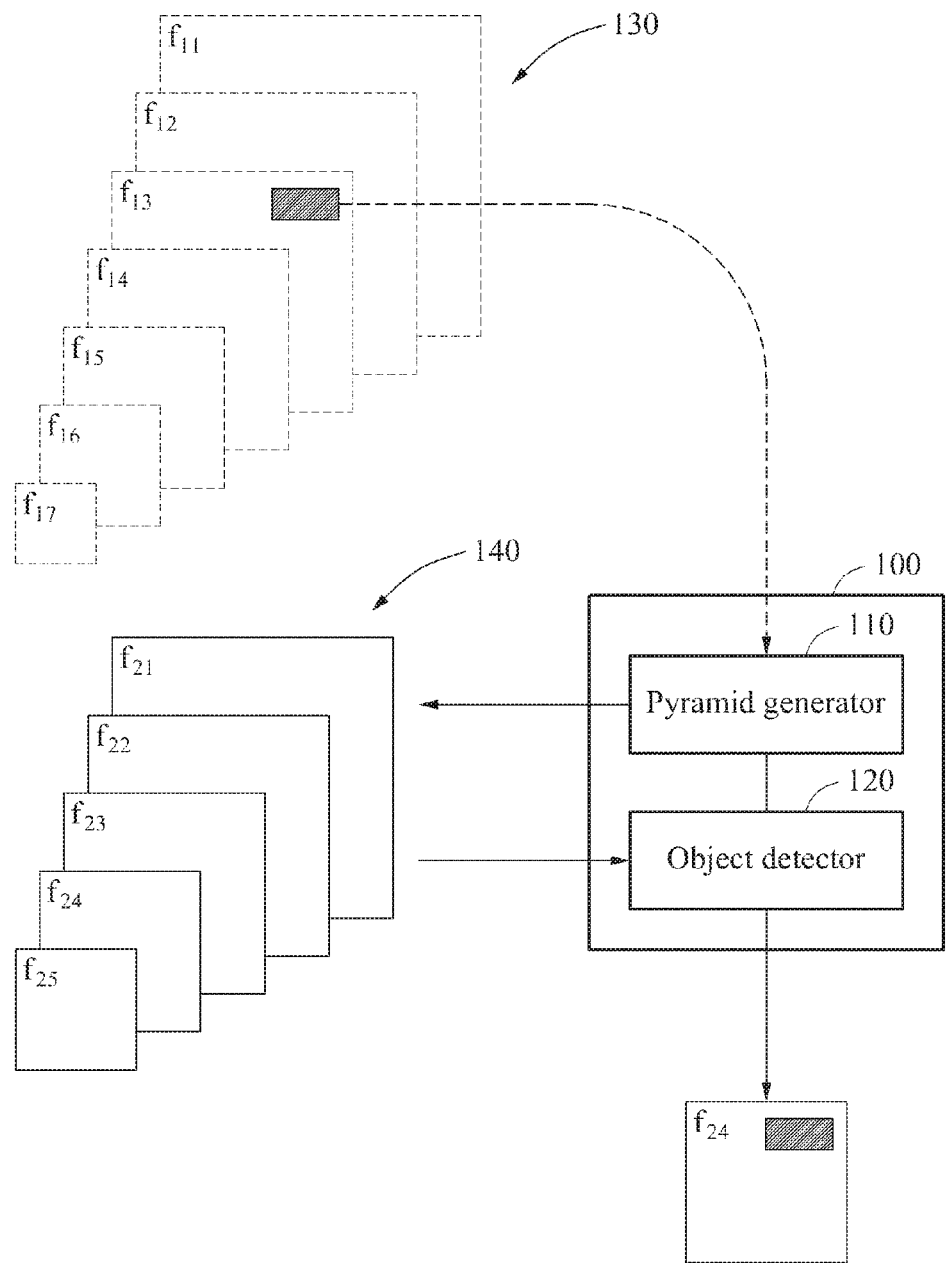
FIG. 1 is a diagram illustrating an object detection apparatus according to at least one example embodiment.

Particular structural or functional descriptions of example embodiments disclosed in the present disclosure are merely intended for the purpose of describing example embodiments and the example embodiments of the present disclosure may be implemented in various forms and should not be construed as being limited to those described in the present disclosure.

Although terms of "first" or "second" are used to explain various components, the components are not limited to the terms. These terms are used only to distinguish one component from another component. For example, a first component may be referred to as a second component, or similarly, the second component may be referred to as the first component within the scope of the right according to the concept of the present disclosure.

As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an object detection apparatus 100 according to at least one example embodiment. Referring to FIG. 1, the object detection apparatus 100 may include a pyramid generator 110 and an object detector 120. The object detection apparatus 100 may detect a target object from an input image. The target object may refer to an object to be detected among various objects included in the input image. The target object may include, for example, a face, an eye or an iris of a user. In an example, in a preprocessing process for user authentication, the object detection apparatus 100 may be used to detect a face, an eye or an iris of a user from an input image captured by a camera. In another example, the object detection apparatus 100 may be used to detect a predetermined and/or selected object from an input image captured by a camera for security.

The object detection apparatus 100 may be implemented as hardware executing a software module, a hardware module or a combination thereof. For example, the object detection apparatus 100 may be implemented by at least one application-specific integrated chip (ASIC) or at least one processor configured to perform operations of each of the pyramid generator 110 and the object detector 120, or various combinations thereof.

The object detection apparatus 100 may use information extracted from a previous frame to detect a target object from a current frame. The current frame may be an image corresponding to a current point in time, and the previous frame may be an image corresponding to a previous point in time. The object detection apparatus 100 may detect the target object from the current frame based on information associated with the target object included in the previous frame.

A target object included in an input image may have various sizes. For example, assuming that a target object to be detected from an input image is an iris of a user, when the user is located close to a camera, a size of the iris in the input image may be greater than a size of the iris in the input image when the user is at a distance from the camera.

Also, a size of the target object may variously change in the input image. For example, when a target object approaches a camera to capture an input image, a size of a target object in the input image may increase. When the target object is away from the camera, the size of the target object in the input image may decrease. In this example, the input image may include consecutive movements of objects.

According to at least one example embodiment, based on various sizes of a target object or a change in a size of the target object, a pyramid image may be used to detect the target object. The pyramid image may be a set of sub-images obtained by changing a size of an original image in a preset range. For example, the pyramid image may be generated by generating a plurality of sub-images by zooming in or out an image corresponding to a frame at a predetermined and/or selected point in time. The pyramid image may include a Gaussian pyramid for downsampling, and a Laplacian pyramid for upsampling.

The pyramid generator 110 may generate a pyramid image corresponding to a predetermined and/or selected frame. For example, the pyramid generator 110 may adaptively generate a pyramid image 140 corresponding to a current frame based on information associated with a target object detected from a previous frame. The information associated with the target object may include at least one of a pyramid identification (ID) of a sub-image from which the target object is detected among a plurality of sub-images included in a pyramid image 130 corresponding to the previous frame, a location of the target object in the previous frame, and a size of the target object in the previous frame.

The pyramid ID may be information used to identify each of a plurality of sub-images included in a pyramid image. The location of the target object may be a location at which the target object is detected from the previous frame. The location of the target object may be, for example, central coordinates of an area corresponding to the target object detected from the previous frame. The size of the target object may be a size of the target object in the sub-image from which the target object is detected among a plurality of sub-images included in a pyramid image corresponding to the previous frame.

Hereinafter, for convenience of description, a previous frame and a current frame may be denoted by $f_1$ and $f_2$, respectively. Also, the sub-images included in the pyramid image 130 corresponding to the previous frame may be denoted by $f_{1,i}$, sub-images included in the pyramid image 140 corresponding to the current frame may be denoted by $f_{2i}$, and i denotes a pyramid ID to distinguish sub-images in a pyramid image. In FIG. 1, the pyramid image 130 may include sub-images $f_{11}$ through $f_{17}$, and the pyramid image 140 may include sub-images $f_{21}$ through $f_{25}$.

The pyramid generator 110 may adaptively generate the pyramid image 140 based on a pyramid ID of a sub-image of the pyramid image 130 from which the target object is detected. For example, in FIG. 1, a target object may be detected from a sub-image $f_{13}$ of the pyramid image 130. In this example, a pyramid ID of the sub-image $f_{13}$ from which the target object is detected may be 3. The pyramid generator 110 may adaptively generate the pyramid image 140 based on the pyramid ID of the sub-image f13.

The pyramid generator 110 may generate a pyramid image of a preset range based on the pyramid ID of the sub-image $f_{13}$, instead of generating a pyramid image of a full range. For example, when a pyramid image corresponding to the current frame includes an extremely large number of sub-images, a period of time to generate the pyramid image and a period of time to detect a target object from the generated pyramid image may increase.

The pyramid generator 110 may limit a number of sub-images included in a pyramid image to a preset number, to reduce a period of time required to generate a pyramid image and to detect an object. The pyramid generator 110 may generate the pyramid image 140 including a proper number of sub-images. For example, the pyramid generator 110 may generate the pyramid image 140 including a total of five sub-images, that is, the sub-images $f_{21}$ through $f_{25}$ based on the pyramid ID i of 3.

The object detector 120 may detect the target object from the pyramid image 140. For example, the object detector 120 may detect the target object from a sub-image $f_{24}$ among the sub-images $f_{21}$ through $f_{25}$ in the pyramid image 140.

The object detector 120 may detect a target object based on various algorithms. For example, the object detector 120 may scan a portion or all of areas of the sub-images $f_{21}$ through $f_{25}$ to detect the target object. A scan area may be adaptively set based on information associated with a target object detected from a previous frame, which will be further described below. Also, the object detector 120 may sequentially or simultaneously scan the sub-images $f_{21}$ through $f_{25}$. An operation of scanning the pyramid image 140 will be further described below.

Figure 2:
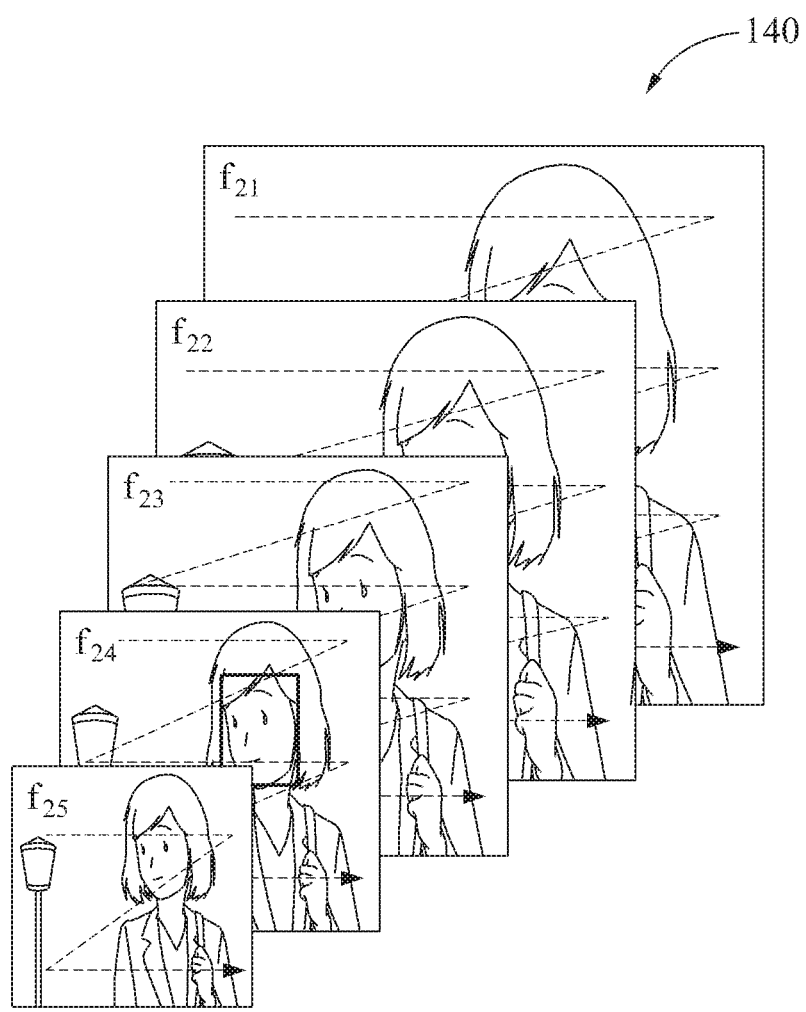
FIG. 2 is a diagram illustrating a scan process of a pyramid image according to at least one example embodiment.

FIG. 2 is a diagram illustrating a scan process of a pyramid image 140 according to at least one example embodiment. Referring to FIG. 2, an object detector may scan a plurality of sub-images, for example, sub-images $f_{21}$ through $f_{25}$, included in the pyramid image 140 to detect a target object.

In an example, the object detector may scan the sub-images in the pyramid image 140 in a preset order. The object detector may scan the sub-images in the pyramid image 140 in an ascending order or descending order of values of pyramid IDs. In another example, the object detector may simultaneously scan the sub-images using parallel processing.

The object detector may scan each of the sub-images in a preset direction, for example, a direction indicated by a dashed line arrow in FIG. 2. In FIG. 2, the object detector may detect a target object while scanning a sub-image $f_{24}$. The detected target object may be indicated by a box of the sub-image $f_{24}$. The target object may be a face of a user in FIG. 2.

The object detector may scan a portion of areas of the pyramid image 140, instead of scanning all the areas of the pyramid image 140. For example, the object detector may detect a target object from a scan area that is adaptively set. As described above, the scan area may be set based on information associated with a target object detected from a previous frame. A process of detecting a target object based on the scan area will be further described below.

Figure 3:
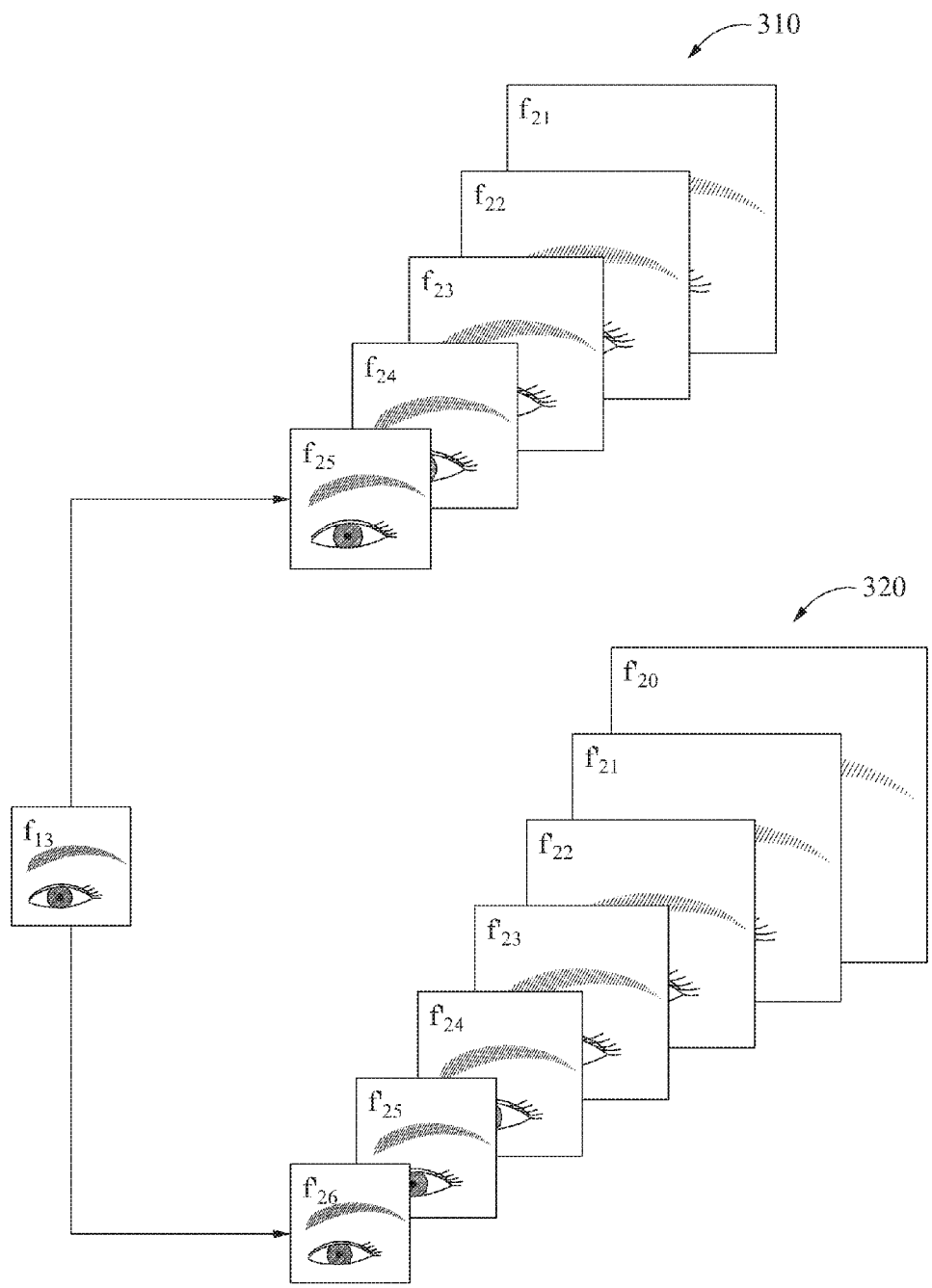
FIG. 3 is a diagram illustrating a range of a pyramid image according to at least one example embodiment.

FIG. 3 illustrates a range of a pyramid image according to at least one example embodiment. The range of the pyramid image may be defined as a difference between a maximum (or highest) ID and a reference ID or a difference between a minimum (or lowest) ID and the reference ID.

A pyramid generator may generate pyramid images 310 and 320 corresponding to a current frame based on information associated with a target object detected from a previous frame. For example, assuming that a target object is detected from a sub-image $f_{13}$ that has a pyramid ID i of 3 and that corresponds to the previous frame, the pyramid generator may generate the pyramid images 310 and 320 corresponding to the current frame based on the pyramid ID i of 3.

Based on a range of a pyramid image, a number of sub-images included in the pyramid image may change. For example, a range of the pyramid image 310 may be 2, and a range of the pyramid image 320 may be 3. In this example, the pyramid image 310 may include two upsampled images and two downsampled images based on a sub-image $f_{23}$ with the pyramid ID i of 3. The pyramid image 320 may include three upsampled images and three downsampled images based on a sub-image $f_{23}$ with the pyramid ID i of 3. Also, the range of the pyramid image 320 may be wider than the range of the pyramid image 310.

When a range of a pyramid image increases, a probability that a target object is detected from the pyramid image may increase, however, a period of time to generate the pyramid image and a period of time to scan the pyramid image may become longer. According to at least one example embodiment, a pyramid image corresponding to a current frame may be adaptively generated based on information associated with a target object detected from a previous frame, and thus it is possible to reduce a period of time to generate and scan a pyramid image while maintaining a high probability that the target object is detected.

The pyramid generator may adjust a range of a pyramid image generated to correspond to a next frame based on whether the target object is detected from the pyramid image corresponding to the current frame. For example, the pyramid generator may generate a pyramid image of a first range corresponding to the current frame. When detecting of a target object from the pyramid image of the first range fails, the pyramid generator may generate a pyramid image corresponding to the next frame in a second range that is wider than the first range. The second range may include a preset full range. A process of adaptively adjusting a range of a pyramid image for generation of a pyramid image will be further described with reference to FIG. 4.

Figure 4:
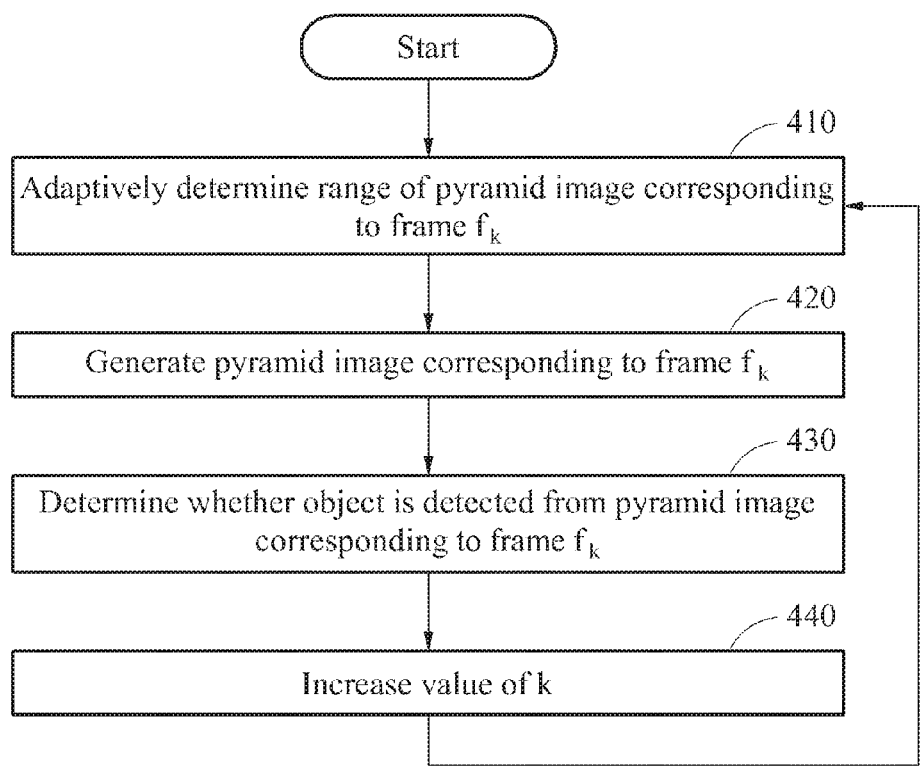
FIG. 4 is a flowchart illustrating a process of adaptively adjusting a range of a pyramid image according to at least one example embodiment.

FIG. 4 is a flowchart illustrating a process of adaptively adjusting a range of a pyramid image according to at least one example embodiment. Referring to FIG. 4, in operation 410, an object detection apparatus may adaptively determine a range of a pyramid image corresponding to a frame $f_k$. For example, the range of the pyramid image may be initialized to a preset range (for example, 2). The frame $f_k$ may be a current frame.

In operation 420, the object detection apparatus may generate the pyramid image corresponding to the frame $f_k$ based on the determined range. In operation 430, the object detection apparatus may determine whether an object is detected from the pyramid image corresponding to the frame $f_k$. In operation 440, the object detection apparatus may increase a value of k.

Due to an increase in the value of k, operation 410 may be reperformed and the frame $f_k$ may be a next frame to the current frame. In operation 410, the object detection apparatus may adaptively adjust a range of a pyramid image corresponding to the frame $f_k$. The object detection apparatus may adjust the range of the pyramid image based on whether the object is detected in operation 430.

In an example, when the object is not detected, the object detection apparatus may increase the range of the pyramid image. The object detection apparatus may increase the range of the pyramid image from 2 to 3. In another example, when the object is detected, the object detection apparatus may decrease the range of the pyramid image. The object detection apparatus may decrease the range of the pyramid image from 2 to 1.

An ID of a pyramid image from which a target object is detected recently may be used as an ID for a criterion of a pyramid image. When the target object is not detected, a preset initial value may be used as an ID for a criterion of a pyramid image.

An adaptive range variation may be determined based on a degree of change in a target object in previous frames. For example, when the target object greatly changes in the previous frames, the adaptive range variation may increase. When the target object slightly changes in the previous frames, the adaptive range variation may decrease. In this example, the change in the target object may include at least one of a change in a location of the target object and a change in a size of the target object.

A size of a target object in a previous frame, and a size of a target object in a current frame may rapidly change. For example, when a user quickly approaches a camera, the size of the target object in the current frame may rapidly increase in comparison to the size of the target object in the previous frame. In this example, the target object may not be detected from a pyramid image corresponding to the current frame. Thus, a generation range of a pyramid may need to change based on a movement of a target object.

Figure 5:
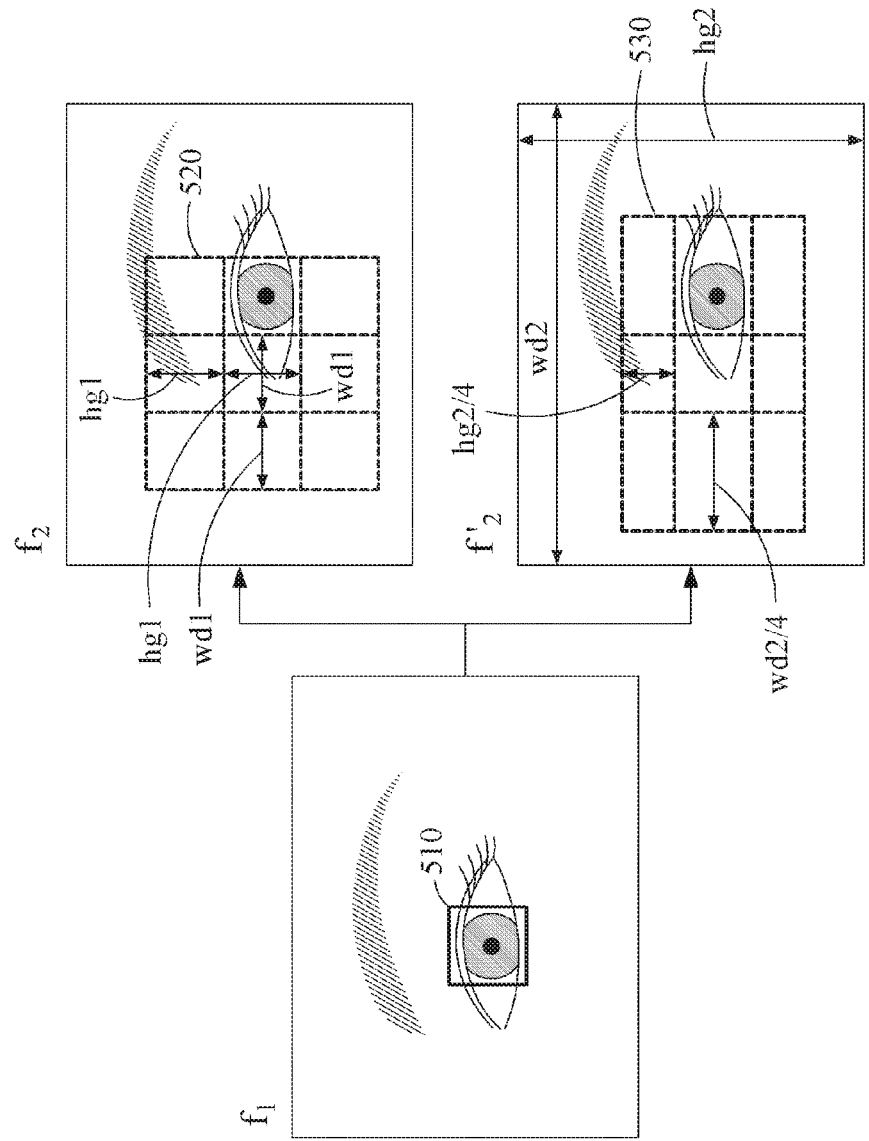
FIG. 5 is a diagram illustrating a process of adaptively setting a scan area according to at least one example embodiment.

FIG. 5 is a diagram illustrating a process of adaptively setting a scan area according to at least one example embodiment. Referring to FIG. 5, a scan area 520 of a current frame $f_2$ or a scan area 530 of a current frame $f_2$ may be set based on information associated with a target object 510 detected from a previous frame $f_1$.

For example, a location of the scan area 520 or 530 may be determined based on a location of the target object 510 detected from the previous frame $f_1$. Central coordinates of the scan area 520 or 530 may be the same as central coordinates of the target object 510.

A size of a scan area may be determined based on a size of a target object or a size of a current frame. In FIG. 5, a size of the scan area 520 may be determined based on a size of the target object 510. The size of the scan area 520 may be determined, for example, based on a width wd1 and a height hg1 of the target object 510. For example, the size of the scan area 520 may be determined to be three times the width wd1 and the height hg1 of the target object 510.

A size of the scan area 530 may be determined based on a size of the current frame $f_2$. The size of the scan area 530 may be determined based on a width wd2 and a height hg2 of the current frame $f_2$.

A target object may be detected from a portion of the current frame $f_2$ or $f'_2$ based on the scan area, and thus it is possible to increase a detection speed of an object.

The scan area may be adjusted based on whether a target object is detected. For example, when detecting of a target object from the current frame $f_2$ or $f'_2$ fails, the scan area may be expanded in a next frame. Also, the scan area may be applied to the above-described pyramid image. For example, an object detector may apply the scan area to each of sub-images included in the pyramid image, and may detect a target object from the scan area.

Figure 6:
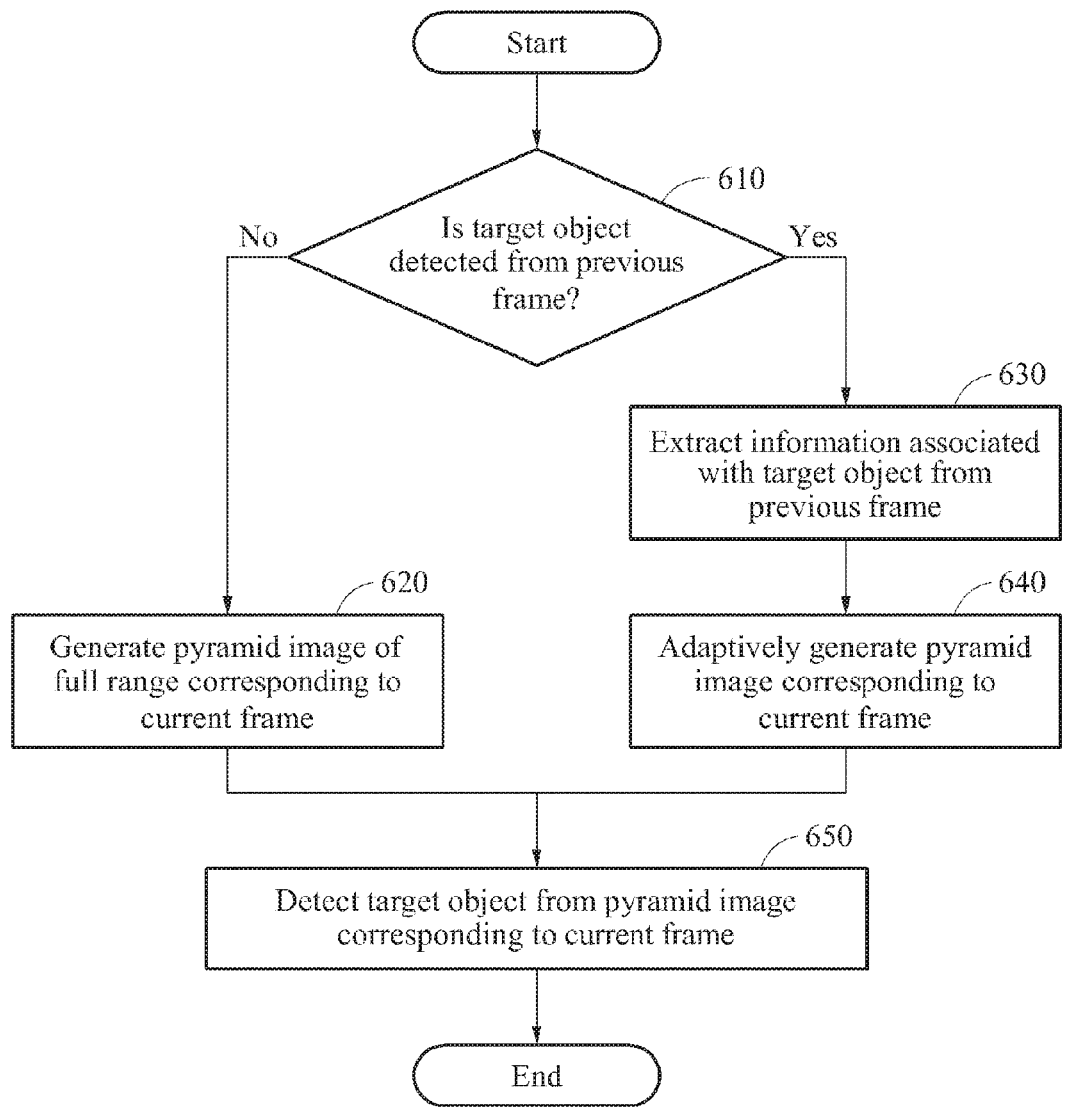
FIG. 6 is a flowchart illustrating an object detection process according to at least one example embodiment.

FIG. 6 is a flowchart illustrating an object detection process according to at least one example embodiment. Referring to FIG. 6, in operation 610, an object detection apparatus (e.g., the object detection apparatus 100) may determine whether a target object is detected from a previous frame. When the target object is not detected from the previous frame, operation 620 may be performed. When the target object is detected from the previous frame, operation 630 may be performed. In operation 620, the object detection apparatus may generate a pyramid image of a full range corresponding to a current frame. The full range may be set in advance.

In operation 630, the object detection apparatus may extract information associated with the target object from the previous frame. The information associated with the target object may include at least one of a pyramid ID of a sub-image from which the target object is detected among sub-images included in a pyramid image corresponding to the previous frame, a location of the target object in the previous frame, and a size of the target object in the previous frame.

In operation 640, the object detection apparatus may adaptively generate a pyramid image corresponding to the current frame. The object detection apparatus may adaptively generate the pyramid image corresponding to the current frame based on information associated with the target object. For example, the object detection apparatus may generate the pyramid image corresponding to the current frame, based on a pyramid ID of a sub-image from which the target object is detected among sub-images included in a pyramid image corresponding to the previous frame.

In operation 650, the object detection apparatus may detect the target object from the pyramid image corresponding to the current frame. Depending on whether the target object is detected from the previous frame, the pyramid image corresponding to the current frame may be a pyramid image of the full range, or a pyramid image corresponding to a portion of the range based on the pyramid ID of the sub-image from which the target object is detected. The object detection apparatus may scan a portion or all of areas of sub-images included in a pyramid image, and may detect a target object. The portion of the areas may refer to the above-described scan area. The above description may be applicable to a process of setting a scan area.

Figure 7:
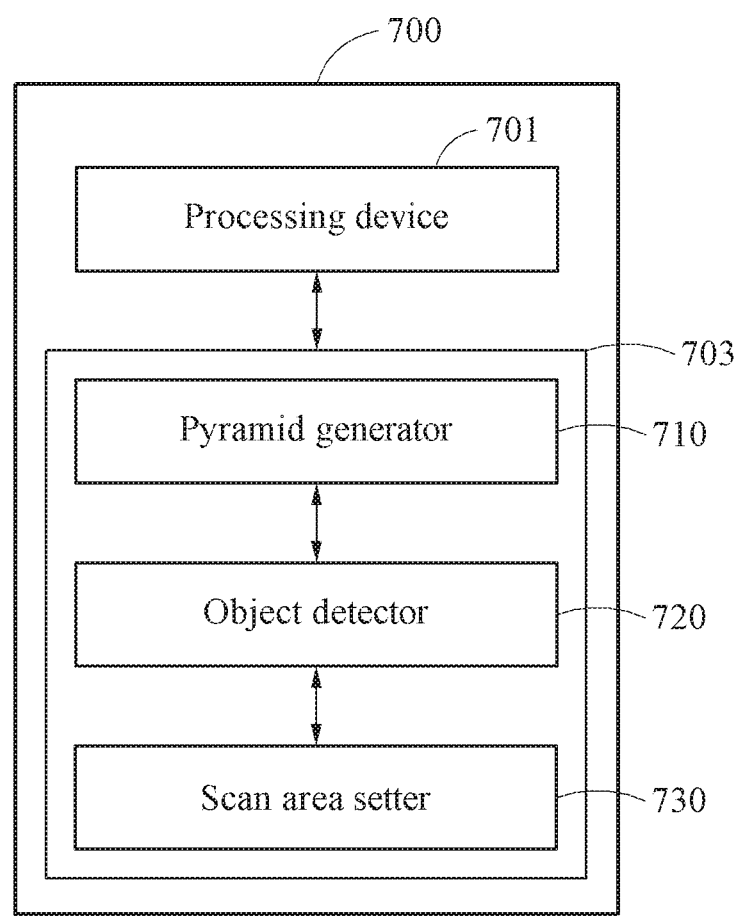
FIG. 7 is a block diagram illustrating a configuration of an object detection apparatus according to at least one example embodiment.

FIG. 7 is a block diagram illustrating a configuration of an object detection apparatus 700 according to at least one example embodiment. Referring to FIG. 7, the object detection apparatus 700 may include a processing device (e.g., a microprocessor) 701 and a memory 703. The memory 703 stores computer readable instructions for performing functions of a pyramid generator 710, and an object detector 720. The pyramid generator 710 may adaptively generate a pyramid image corresponding to a current frame based on information associated with a target object detected from a previous frame. The object detector 720 may detect the target object from the pyramid image.

The object detection apparatus 700 may further include a scan area setter 730. The scan area setter 730 may adaptively set a scan area to detect the target object from the pyramid image corresponding to the current frame based on the information associated with the target object. In addition, the pyramid generator 710, the object detector 720 and the scan area setter 730 may perform the above-described operations of FIGS. 1-6 to detect an object. The processing device 701 is configured to perform the functions of the pyramid generator 710, the object detector 720 and the scan area setter 730 by executing the computer readable instructions stored in the memory 703.

Figure 8:
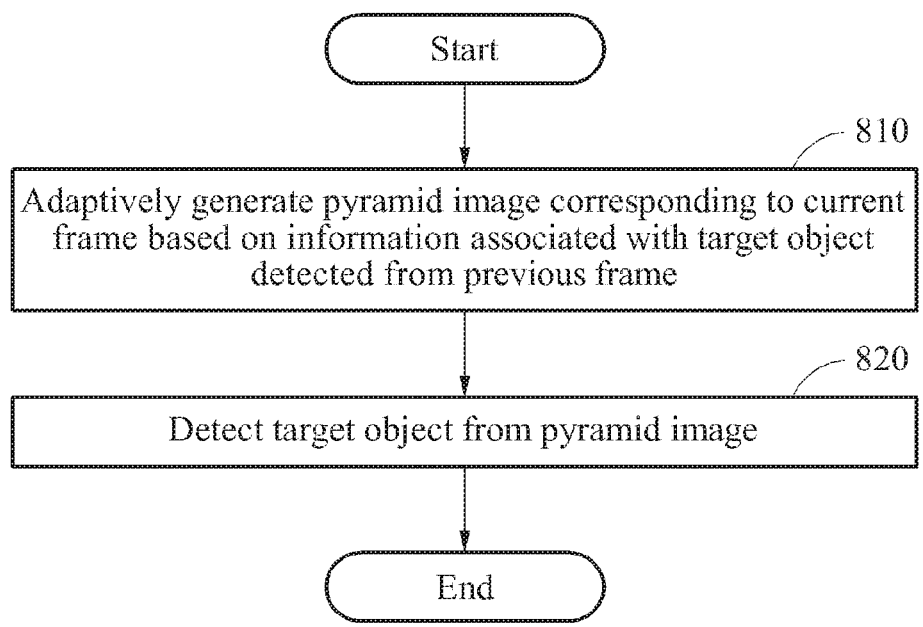
FIG. 8 is a flowchart illustrating an example of an object detection method based on a pyramid image according to at least one example embodiment.

FIG. 8 is a flowchart illustrating an example of an object detection method based on a pyramid image according to at least one example embodiment. Referring to FIG. 8, in operation 810, an object detection apparatus may adaptively generate a pyramid image corresponding to a current frame based on information associated with a target object detected from a previous frame. In operation 820, the object detection apparatus may detect the target object from the pyramid image.

Figure 9:
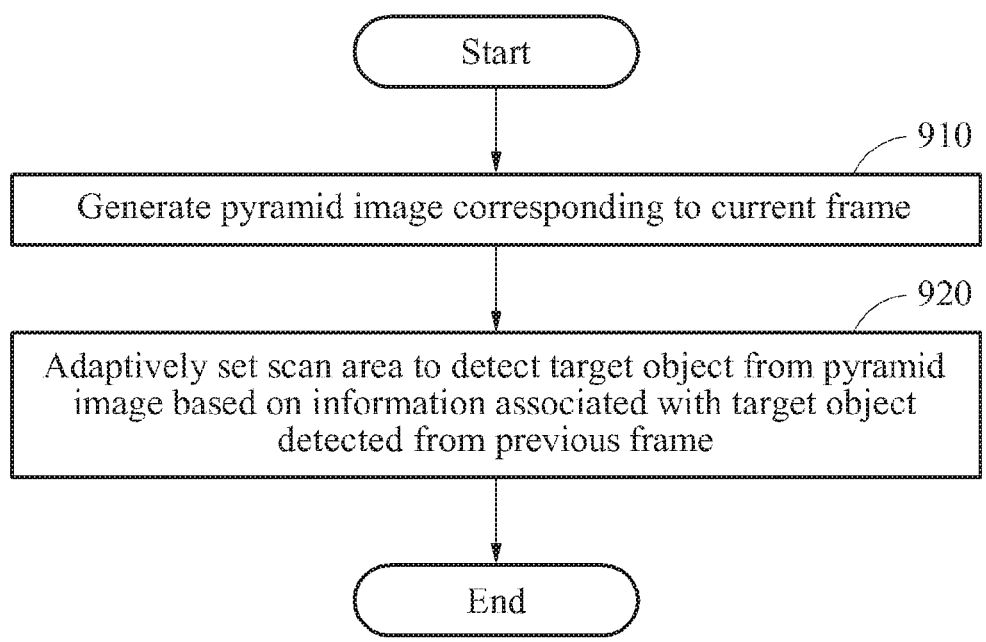
FIG. 9 is a flowchart illustrating another example of an object detection method based on a pyramid image according to at least one example embodiment.

FIG. 9 is a flowchart illustrating another example of an object detection method based on a pyramid image according to at least one example embodiment. Referring to FIG. 9, in operation 910, an object detection apparatus may generate a pyramid image corresponding to a current frame. In operation 920, the object detection apparatus may adaptively set a scan area to detect a target object from the pyramid image based on information associated with a target object detected from a previous frame.

The units and/or modules (e.g., the pyramid generator 710, the object detector 720 and the scan area setter 730) described herein may be implemented using hardware components, hardware executing software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An object detection method comprising:
adaptively generating a pyramid image corresponding to a current frame based on information associated with a target object in a previous frame; and
scanning for the target object from the pyramid image corresponding to the current frame.

2. The object detection method of claim 1, wherein the information associated with the target object comprises at least one of (i) a pyramid identification (ID) of a selected sub-image including the target object, the selected sub-image being one of a plurality of sub-images included in a pyramid image corresponding to the previous frame, (ii) a location of the target object in the selected sub-image, and (iii) a size of the target object in the selected sub-image.

3. The object detection method of claim 1, wherein the target object comprises at least one of a face, an eye and an iris of a user.

4. The object detection method of claim 2, wherein the adaptively generating generates the pyramid image corresponding to the current frame to have a first range of the plurality of sub-images based on the pyramid ID.

5. The object detection method of claim 4, further comprising:
generating a pyramid image corresponding to a next frame based on the pyramid ID if the target object is not detected from the pyramid image corresponding to the current frame, the pyramid image corresponding to the next frame having a second range of another plurality of sub-images, wherein the second range is larger than the first range.

6. The object detection method of claim 1, further comprising:

adaptively setting a scan area of the pyramid image to detect the target object based on the information associated with the target object.

7. The object detection method of claim 6, wherein the information associated with the target object is based on at least one of (i) a location of the target object in the previous frame, (ii) a size of the target object in the previous frame, and (iii) a size of a selected sub-image including the target object, the selected sub-image being one of a plurality of sub-images in a pyramid image corresponding to the previous frame.

8. The object detection method of claim 6, wherein the scanning includes:

scanning a plurality of sub-images in the pyramid image corresponding to the current frame based on the scan area; and detecting the target object.

9. The object detection method of claim 1, further comprising:

extracting the information associated with the target object from a pyramid image of a full range corresponding to the previous frame.

10. The object detection method of claim 1, wherein the adaptively generating includes:

adaptively determining a number of sub-images in the pyramid image corresponding to the current frame based on the information associated with the target object.

11. The object detection method of claim 10, further comprising:

adaptively determining a number of sub-images in a pyramid image corresponding to a next frame based on at least one of (i) whether the target object is detected from the pyramid image corresponding to the current frame and (ii) a change in the target object.

12. The object detection method of claim 11, wherein the change in the target object comprises at least one of a change in a location of the target object and a change in a size of the target object.

13. A computer program embodied on a non-transitory computer readable medium, when executed by a processor, configured to cause the processor to perform the method of claim 1.

14. An object detection apparatus comprising:

at least one processor configured to execute computer readable instructions to, adaptively generate a pyramid image corresponding to a current frame based on information associated with a target object in a previous frame; and detect the target object from the pyramid image corresponding to the current frame.

15. The object detection apparatus of claim 14, wherein the information associated with the target object comprises at least one of (i) a pyramid identification (ID) of a selected sub-image including the target object, the selected sub-image being one of a plurality of sub-images in a pyramid image corresponding to the previous frame, (ii) a location of the target object in the selected sub-image, and (iii) a size of the target object in the selected sub-image.

16. The object detection apparatus of claim 14, wherein the target object comprises at least one of a face, an eye and an iris of a user.

17. The object detection apparatus of claim 14, wherein the processor is configured to adaptively set a scan area to detect the target object from the pyramid image corresponding to the current frame based on the information associated with the target object.

* * * * *